(12) United States Patent
Hirano (10) Patent No.: US 10,399,512 B2
(45) Date of Patent: Sep. 3, 2019

(54) INTERIOR COMPONENT MOUNTING STRUCTURE

(71) Applicant: TOYOTA BOSHOKU KABUSHIKI KAISHA, Aichi-ken (JP)

(72) Inventor: Hirokazu Hirano, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 28 days.

(21) Appl. No.: 15/845,319

(22) Filed: Dec. 18, 2017

(65) Prior Publication Data

US 2018/0170284 A1 Jun. 21, 2018

(30) Foreign Application Priority Data

Dec. 21, 2016 (JP) ................................. 2016-247602

(51) Int. Cl.
*B60R 13/02* (2006.01)

(52) U.S. Cl.
CPC ...... *B60R 13/0206* (2013.01); *B60R 13/0237* (2013.01)

(58) Field of Classification Search
CPC ......................... B60R 13/0237; B60R 13/0206
USPC ....................................................... 296/1.08
See application file for complete search history.

(56) References Cited

U.S. PATENT DOCUMENTS

| | | | | |
|---|---|---|---|---|
| 4,765,575 A * | 8/1988 | Bergl | .................. | A47B 96/065 108/152 |
| 5,738,367 A * | 4/1998 | Zichichi | .............. | B60R 21/2165 280/728.3 |
| 6,102,473 A * | 8/2000 | Steininger | ........... | B60R 13/0206 296/209 |
| 6,457,738 B1 * | 10/2002 | Labrie | ................... | B60R 21/216 280/728.3 |
| 7,621,591 B2 * | 11/2009 | Arellano | ............. | B60R 13/0231 296/214 |
| 8,646,827 B2 * | 2/2014 | Zimmerman | ....... | B60R 13/0256 180/90 |

FOREIGN PATENT DOCUMENTS

JP 2013-151211 8/2013

* cited by examiner

*Primary Examiner* — Pinel E Romain
(74) *Attorney, Agent, or Firm* — Greenblum & Bernstein, P.L.C.

(57) ABSTRACT

An interior component mounting structure for mounting an elongated interior component to an interior assembly includes a mounting portion and locking portions of the interior component and insertion holes and a fitting groove in the interior assembly. The mounting portion protrudes from a back surface of the interior component and extends along a longitudinal direction of the interior component. The locking portions protrude from a distal end of the mounting portion to be spaced at predefined intervals in the longitudinal direction of the interior component. The ends of the interior component are inserted into the insertion holes. The mounting portion is fitted into the fitting groove. The fitting groove includes locking holes in which the locking portions are held, respectively. The locking holes have a dimension measuring in the longitudinal direction of the interior component greater than a dimension of the locking portions measuring in the longitudinal direction of the interior component.

10 Claims, 9 Drawing Sheets

IN ← → OUT

INTERIOR COMPONENT MOUNTING STRUCTURE

CROSS REFERENCE TO RELATED APPLICATION

This application claims priority from Japanese Patent Application No. 2016-247602 filed on Dec. 21, 2016. The entire contents of the priority application are incorporated herein by reference.

TECHNICAL FIELD

The present disclosure relates to an interior component mounting structure.

BACKGROUND

An example of an interior component mounting structure is a mounting structure for mounting an elongated design component (an interior component) to an interior garnish trim (an interior assembly). The interior component mounting structure includes hooks that protrude from a back surface of the design component at predefined intervals and mounting holes formed in the interior garnish trim. The design component is mounted to the interior garnish trim with the hooks fitted in the mounting holes. Another example may include screws instead of the hooks.

Although such an interior component mounting structure is suitable for mounting an elongated interior component having a certain length, it is not suitable for mounting an elongated interior component having a significantly large length and a small width. As the length increases and the width decreases, the mounting of the elongated interior component with the interior component mounting structure becomes more difficult because the elongated interior components are subjected to heat. If thermal expansion occurs, a section of the elongated interior component between adjacent fixing points may warp resulting in improper mounting. Furthermore, the elongated interior component may not have a sufficient size of mounting area required for mounting the elongated interior component with screws. Even if the elongated interior component has the sufficient size of area, warp or deformation due to heat is still an issue. The larger the length of the elongated interior component, the larger the influence of heat, that is, a variation in length of the elongated interior component due to thermal expansion and contraction tends to increase.

SUMMARY

The present invention was made in view of the foregoing circumstances. An object is to provide an interior component mounting structure which enables proper mounting of the interior component with a simple configuration at low cost even if the interior component has an elongated shape.

An interior component mounting structure for mounting an elongated interior component to an interior assembly includes a mounting portion and locking portions of the interior component and insertion holes and a fitting groove in the interior assembly. The mounting portion is formed by extrusion molding. The mounting portion protrudes from a back surface of the interior component and extends along a longitudinal direction of the interior component. The locking portions protrude from a distal end of the mounting portion to be spaced at predefined intervals in the longitudinal direction of the interior component. The ends of the interior component are inserted into the insertion holes. The mounting portion is fitted into the fitting groove. The fitting groove includes locking holes in which the locking portions are held, respectively. The locking holes have a dimension measuring in the longitudinal direction of the interior component greater than a dimension of the locking portions measuring in the longitudinal direction of the interior component.

According to the technology disclosed herein, a simple and inexpensive mounting structure for mounting an elongated interior component to an interior assembly can be provided.

DETAILED DESCRIPTION

An embodiment will be described with reference to FIGS. 1 to 9. A vehicle 1 illustrated in FIG. 9 includes a seat 11, a pillar 12, a window 13, and an interior assembly 50. The pillar 12 is located beside the seat 11. The window 13 is located closer to the front of the vehicle 1 relative to the pillar 12. The interior assembly 50 is located below the window 13 and configured to form an interior design of the vehicle. The interior assembly 50 has an elongated shape that extends in the front-rear direction of the vehicle 1 and includes a design surface 50A. A design component 20 that is an elongated interior component is mounted to the design surface 50A. Arrows in some drawings indicate the width direction of the vehicle 1. "IN" and "OUT" represent the inner side of the vehicle 1 and the outer side of the vehicle 1, respectively. The "design surface" is a surface of the interior assembly 50 facing the inner side of the vehicle 1 and "back surface" is a surface of the interior assembly 50 facing the outer side of the vehicle 1, that is, the "design surface" is a surface of the interior assembly 50 to which the design component 20 is mounted and the "back surface" is an opposite surface of the interior assembly 50 from the surface to which the design component 20 is mounted.

The design component 20 is an elongated interior component mounted to the interior assembly to improve an appearance of the interior of the vehicle 1. The design component 20 is made of rubber and formed by extrusion molding. The design component 20 is an elongated member with a length of 2000 mm and a width of 10 mm. A design component having a length and a width different from those of the design component 20 and mounted to a different interior assembly may be included in the technical scope of the present invention. The design component 20 includes a design portion 20C with a design surface 20A and a back surface 20B, a connecting portion 26, a mounting portion 22, and locking portions 25. The design portion 20C is formed in a curved shape that is curved toward the inner side of the vehicle 1. The design surface 20A is a surface of the design portion 20C on the inner side of the vehicle 1 and covered with a plating film 30 (see FIG. 7). The back surface 20B is a surface of the design portion 20C on the outer side of the vehicle 1 opposite from the design surface 20A. The connecting portion 26 connects the design portion 20C to the mounting portion 22.

Figure 1:
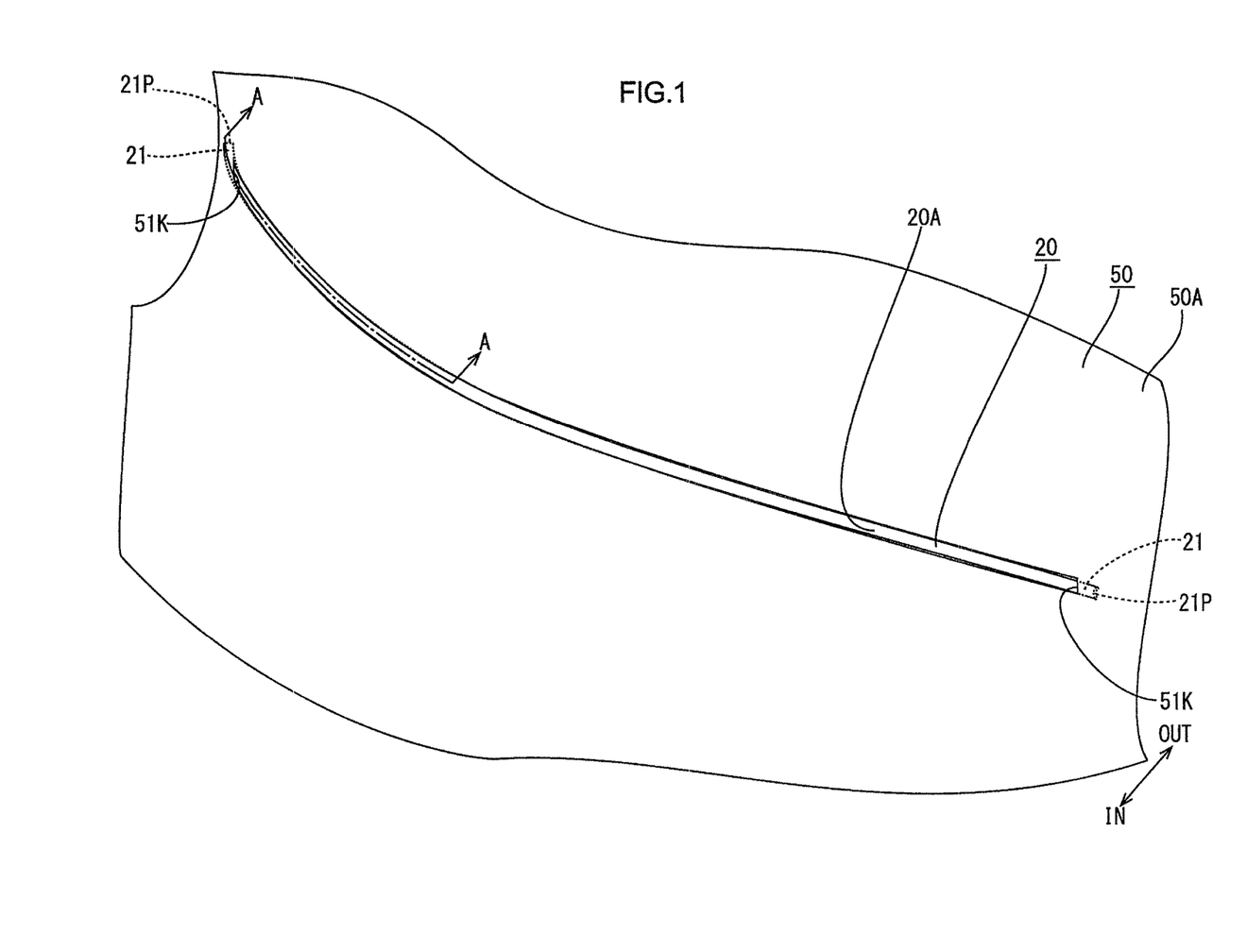
FIG. 1 is a perspective view illustrating a section of an interior assembly with a design component mounted.
Figure 2:
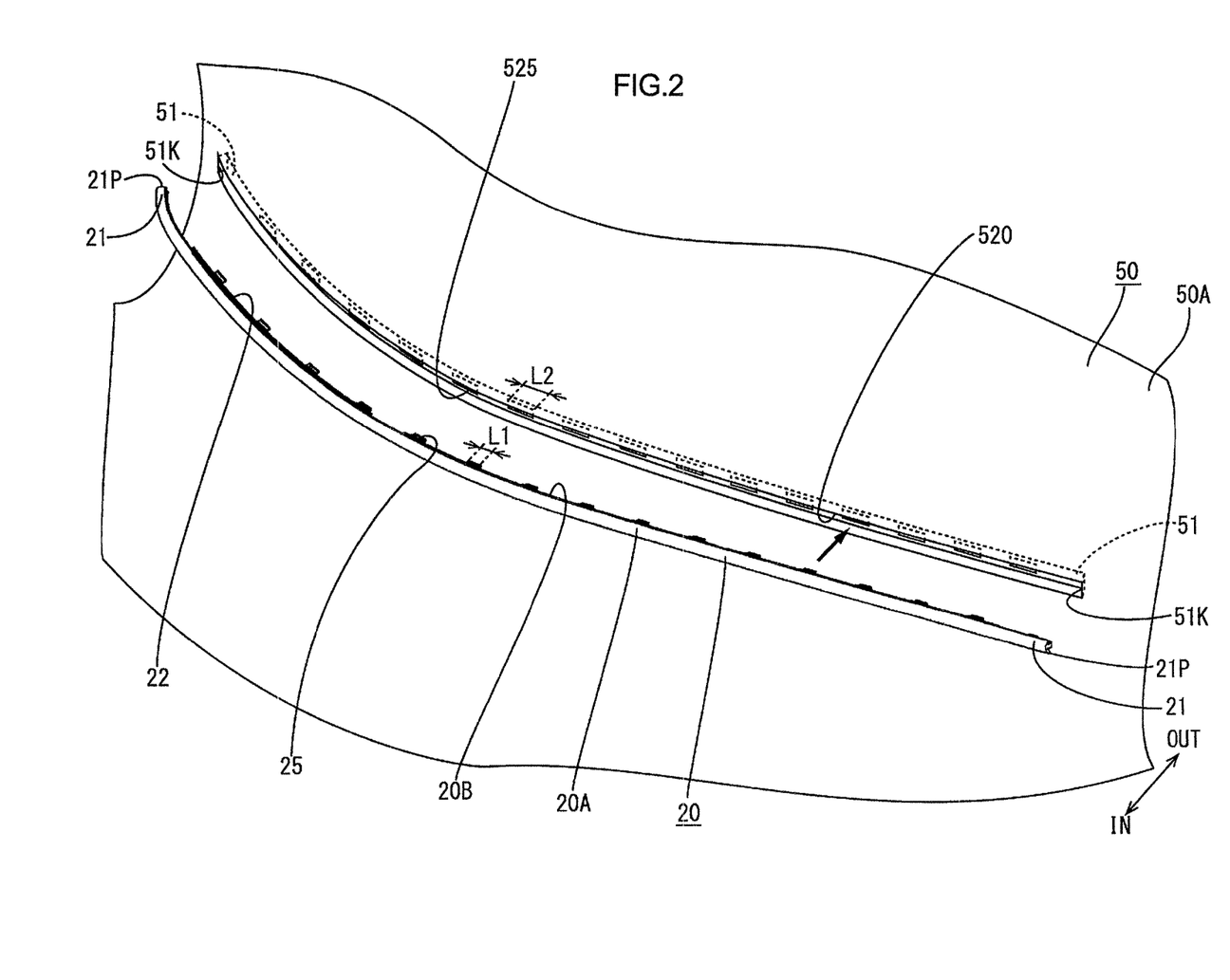
FIG. 2 is a perspective view illustrating a mounting configuration of the design component to the interior assembly.
Figure 3:
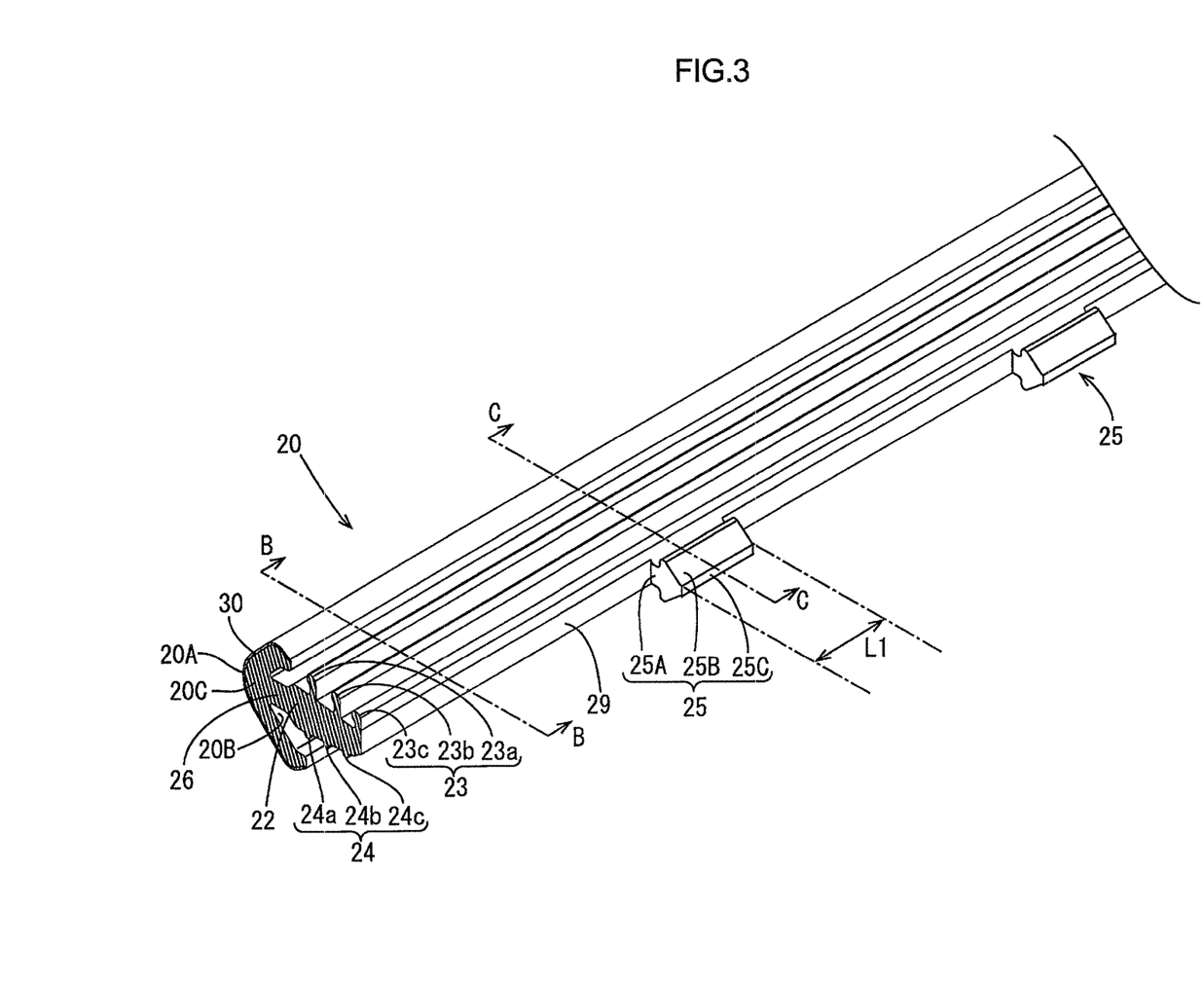
FIG. 3 is a perspective view illustrating a section of the design component viewed from the rear.
Figure 4:
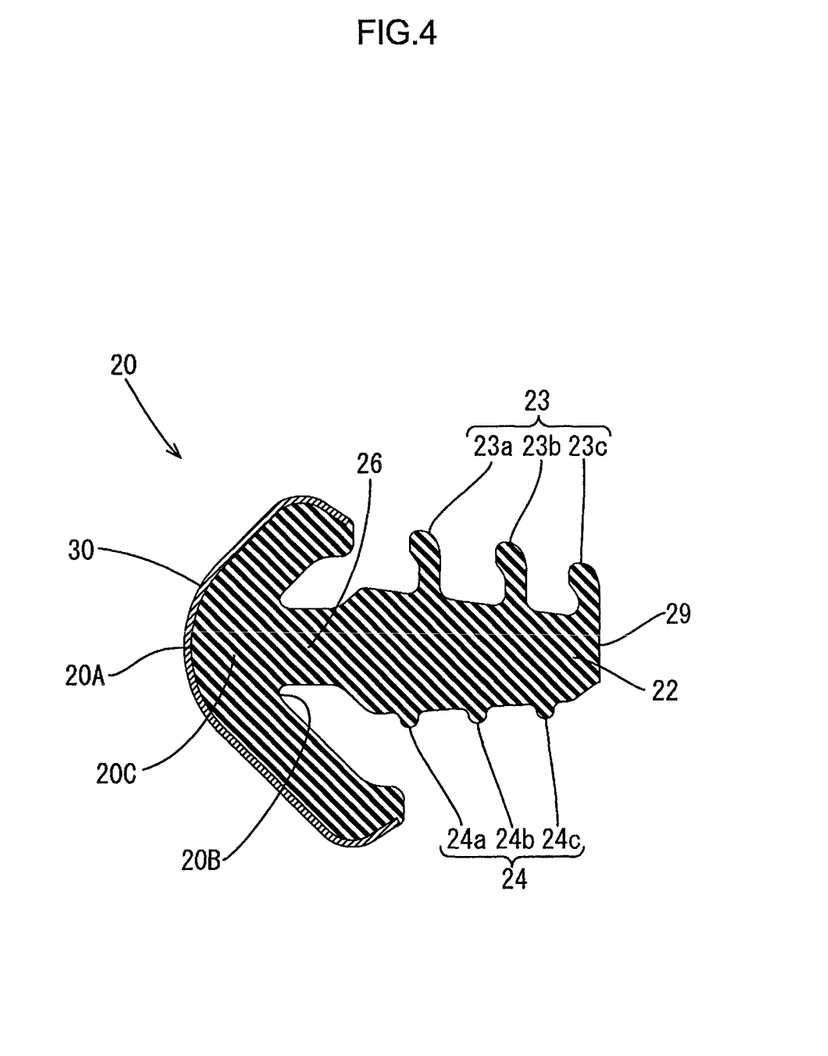
FIG. 4 is a cross-sectional view along line B-B in FIG. 3.

As illustrated in FIGS. 2 and 3, the mounting portion 22 has an elongated shape and protrudes from the back surface 20B in a direction that crosses the back surface 20B. The mounting portion 22 extends in the longitudinal direction of the back surface 20B for an entire length of the design component 20. The mounting portion 22 includes a first protruding section 23 and a second protrusion section 24 that protrude in a direction that crosses the protruding direction of the mounting portion 22 (a fitting direction in which the mounting portion 22 are fitted in a design component mounting recess 520, which will be described later). The first protrusion section 23 includes a first protrusion 23a, a second protrusion 23b, and a third protrusion 23c that protrude from a first surface of the mounting portion 22 on an upper side when the design component 20 is mounted to the interior assembly 50. The second protruding section 24 includes a first bump 24a, a second bump 24b, and a third bump 24c that protrude from a second surface of the mounting portion 22 on a lower side when the design component 20 is mounted to the interior assembly 50. As illustrated in FIGS. 3 and 4, the height of the first protruding section 23 (the first protrusion 23a, the second protrusion 23b, and the third protrusion 23c) is larger than the height of the second protruding section 24 (the first bump 24a, the second bump 24b, and the third bump 24c).

Figure 5:
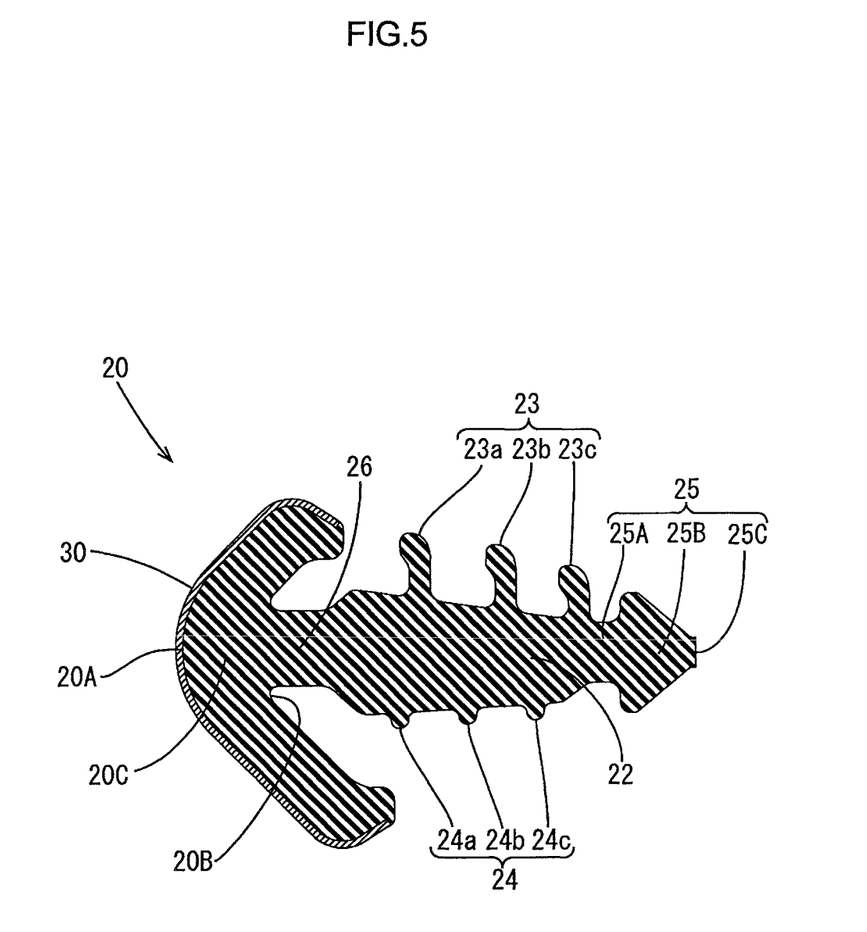
FIG. 5 is a cross-sectional view along line C-C in FIG. 3.

The locking portions 25 protrude from a distal end surface 29 of the mounting portion 22 to be spaced at intervals in the longitudinal direction of the design component 20. The locking portions 25 extend in the longitudinal direction of the design component 20. Each locking portion 25 includes a base 25A that is coupled with the distal end surface 29 of the mounting portion 22, a head 25B, and a distal end surface 25C. As illustrated in FIGS. 3 and 5, the locking portion 25 is formed in a shape with a cross section cut along the extending direction of the locking portion 25 such that a section of the body coupled with the base 25A has a dimension measuring in a direction perpendicular to the extending direction of the locking portion 25 is greater than the dimension of the base 25A measuring in the same direction and the dimension of the head 25B gradually decreases toward the distal end surface 25C. In a forming process of the design component 20, an intermediate including the design surface 20A, the mounting portion 22, and the locking portions 25 is formed in the shape with a cross section illustrated in FIG. 5 by extrusion molding and a section of the intermediate farther from the design surface 20A than the mounting portion 22 (on the right side in FIG. 5) is trimmed to form the locking portions 25 at predefined intervals. Ends of the intermediate are trimmed to form ends 21 of the mounting portion 22 in a shape illustrated in FIGS. 2 and 6 so that the ends 21 can be easily inserted into insertion holes 51K of the interior assembly 50.

Figure 7:
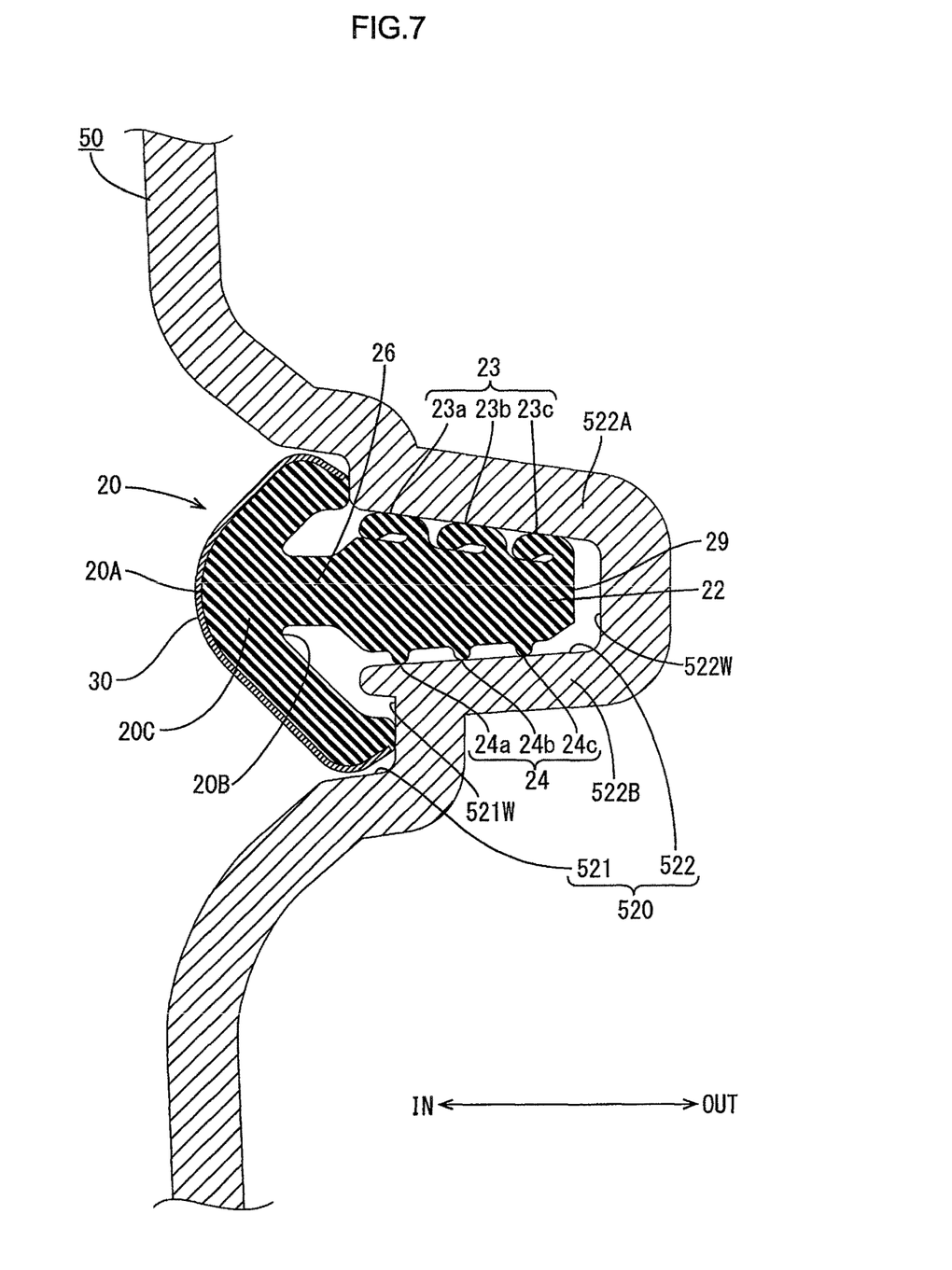
FIG. 7 is a cross-sectional view along line D-D in FIG. 6.
Figure 8:
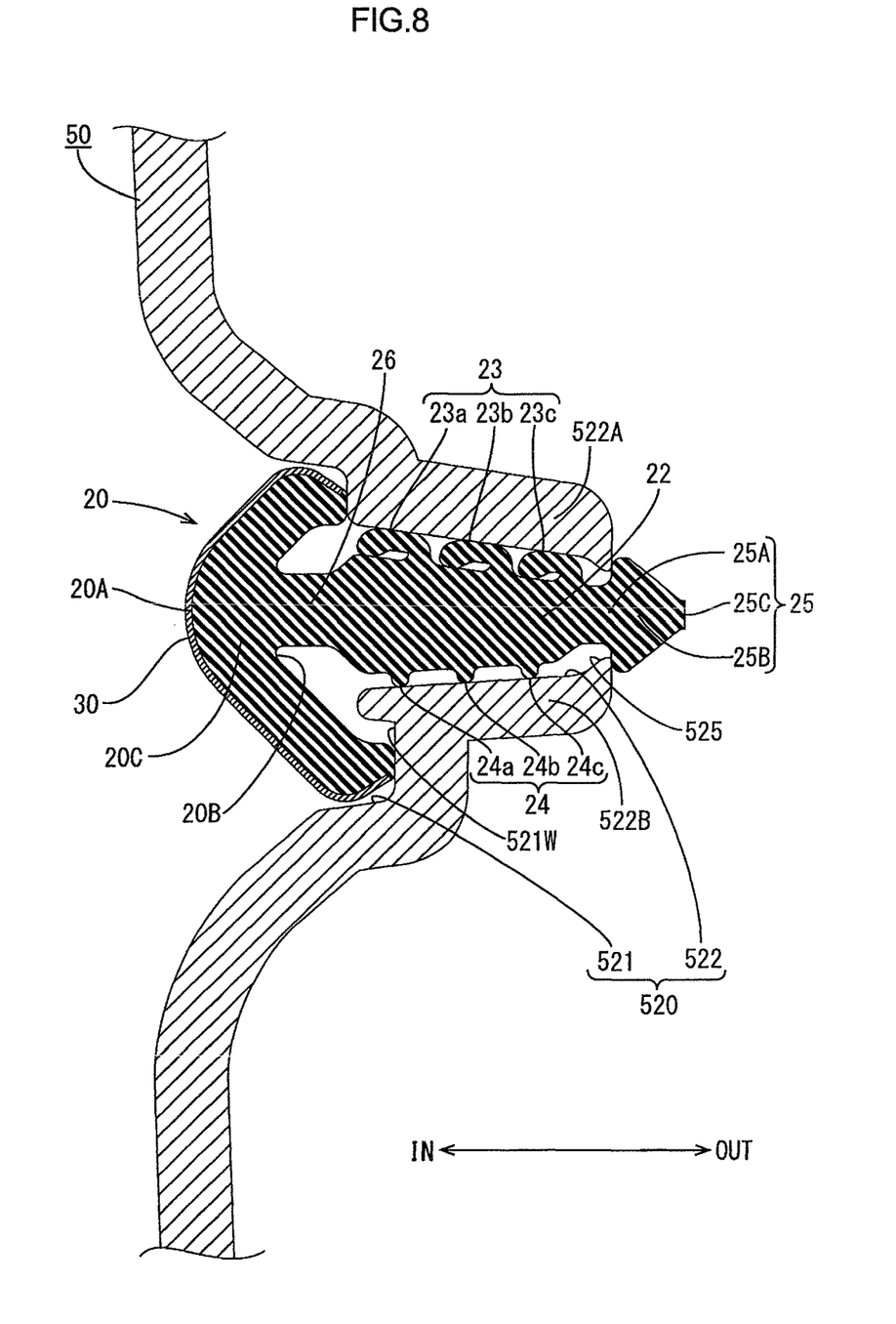
FIG. 8 is a cross-sectional view along line E-E in FIG. 6.
Figure 9:
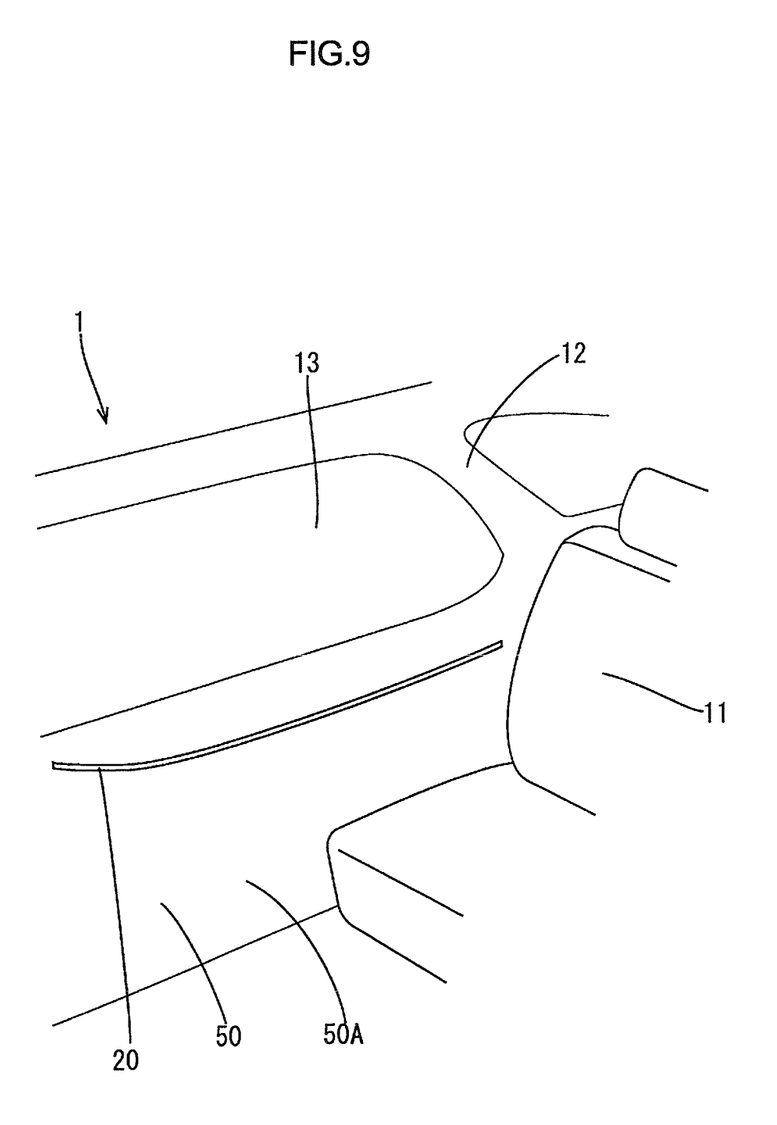
FIG. 9 is a partial perspective view of an interior of a vehicle according to the embodiment.

As illustrated in FIG. 2, the interior assembly 50 includes the design component mounting recess 520 (a fitting groove) with an opening in the design surface 50A for mounting the design component 20. The design component mounting recess 520 includes the insertion holes 51K at ends 51 of the opening into which the ends 21 of the design component 20 are inserted. The design component mounting recess 520 is recessed toward the outer side of the vehicle 1. As illustrated in FIG. 7, the design component mounting recess 520 includes a first recessed section 521 and a second recessed section 522. The first recessed section 521 is recessed from the design surface 50A of the interior assembly 50 with an opening in the design surface 50A. The first recessed section 521 includes a back wall 521W opposed to the opening. The second recessed portion 522 is recessed from the back wall 521W of the first recessed section 521 with an opening in the back wall 521W of the first recessed section 521. The first recesses section 521 is recessed from the design surface 50A toward the outer side of the vehicle 1 and the second recesses section 522 is recessed from the back wall 521W of the first recessed section 521 toward the outer side of the vehicle 1 to form a two-tier structure. A short dimension of an opening of the first recessed section 521, which corresponds with the opening of the design component mounting recess 520, is greater than a short dimension of the opening of the second recessed section 522.

Figure 6:
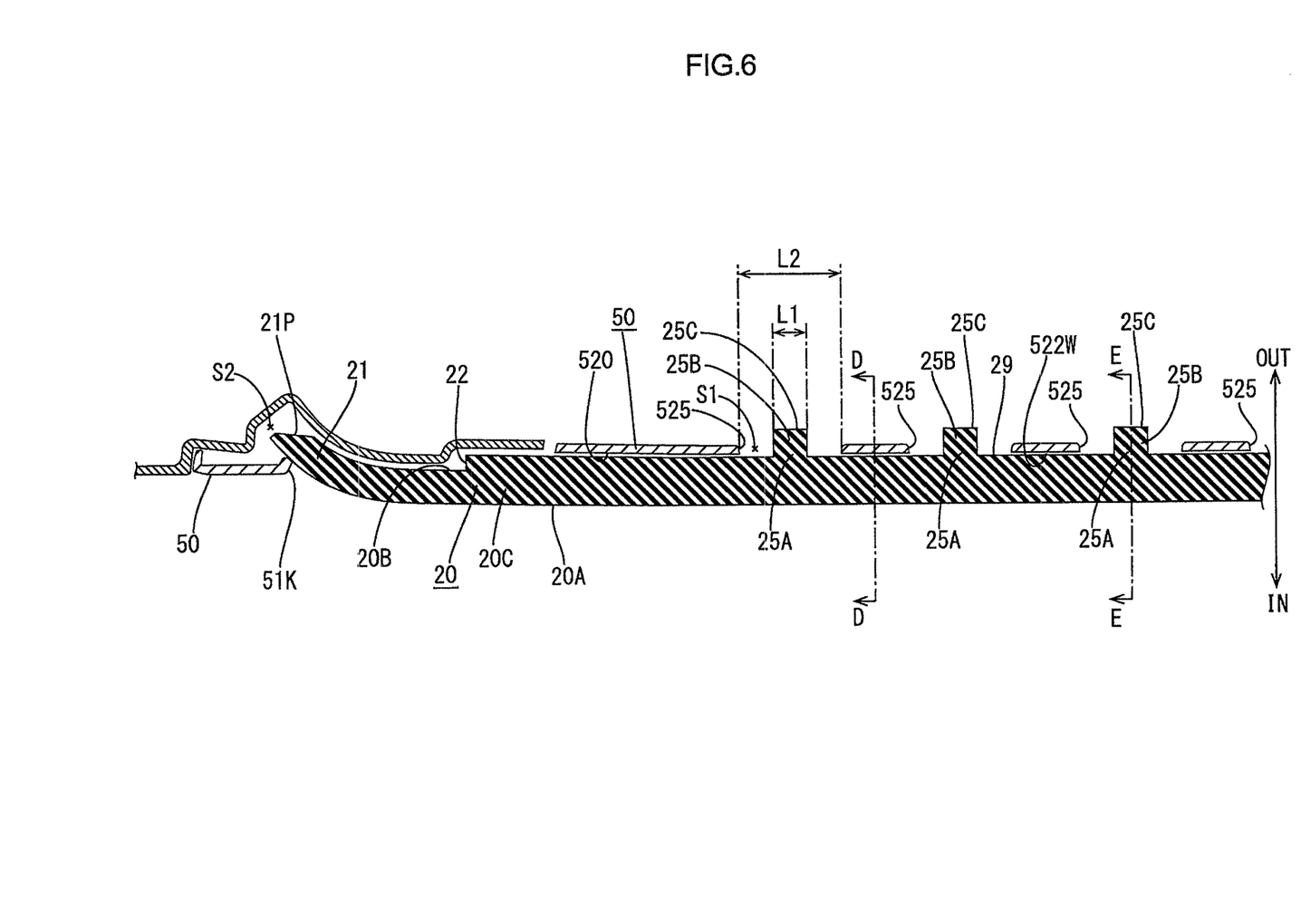
FIG. 6 is a cross-sectional view along line A-A in FIG. 1.

The second recessed section 522 includes a top wall 522A, a bottom wall 522B, and a back wall 522W. The top wall 522A and the bottom wall 522B extend in the longitudinal direction of the design component mounting recess 520. The back wall 522W is between the ends of the top wall 522A and the bottom wall 522B away from the opening of the second recessed section 522 on the outer side of the vehicle 1 to connect the end of the top wall 522A to the end of the bottom wall 522B. The top wall 522A, the bottom wall 522B, and the back wall 522W define a space that holds the mounting portion 22. The back wall 522W includes locking holes 525 at positions corresponding to the locking portions 25 for holding the locking portions 25 therein, respectively. Each locking hole 525 has a rectangular shape that extends in the longitudinal direction of the design component 20. As illustrated in FIGS. 2 and 6, a dimension of the locking hole measuring in the longitudinal direction thereof (or in the longitudinal direction of the design component 20), that is, a length L2 is greater than a length L1 of each locking portion 25 (the dimension measuring in the longitudinal direction of the design component 20).

The mounting portion 22 of the design component 20 is fitted in the second recessed section 522 such that the design portion 20C and the connecting portion 26 are disposed in the first recessed section 521 and heads 25B of the locking portions 25 project from the second recessed portion 522 toward the outer side of the vehicle 1.

To mount the design component 20 to the interior assembly 50, the mounting portion 22 of the design component 20 is inserted into the design component mounting recess 520 and fitted therein as illustrated in FIG. 2. The design component 20 is warped to insert the ends 21 into the respective insertion holes 51K, the mounting portion 22 is fitted in the second recessed section 522 via the first recessed section 521 for the entire length of the mounting portion 22, and the locking portions 25 are inserted into the respective locking holes 525 (see FIGS. 6 to 8). With the locking portions 25, fitting of the mounting portion 22 in the design component mounting recess 520 is further ensured. Because the design component 20 is made of rubber, sections of the mounting portion 22 on which the locking portions 25 are not formed are held against the inner walls of the second recessed section 522 with friction between the inner walls of the second recessed section 522 and the first protruding section 23 (the first to the third protrusions 23a to 23c) and the second protruding section 24 (the first to the third bumps 24a to 24c). Because the first to the third protrusions 23a to 23c of the first protruding section 23 have the larger length, large friction is produced due to resilience of the first to the third protrusions 23a to 23c produced when they are inserted into the second recessed section 522. Therefore, the mounting portion 22 is stably fitted and thus a mounting condition of the design component 20 remains stable.

The length L2 of each locking hole 525 is greater than the length L1 of each locking portion 25 measuring in the longitudinal direction of the design component 20. Therefore, when the locking portion 25 is inserted in the corresponding locking hole 525, a space S1 is provided. The space S1 allows the locking portion 25 to move within a specific range when the design component 20 is subjected to heat and thermal expansion or contract occurs.

The ends 21 of the design component 20 are inserted into the insertion holes 51K and mounted without fixing members such as screws. Therefore, the ends 21 are movable along the longitudinal direction of the design component 20 in spaces S2 in which tips 21P of the ends 21 are inserted as illustrated in FIG. 6. The design component 20 is fixed in the direction of the short dimension thereof with the mounting portion 22 and the locking portions 25 fitted in the design component mounting recess 520 and movable in the longitudinal direction thereof so that the design component 20 can be moved in the specific range even when the design component 20 is subjected to heat and the thermal expansion or contraction occurs.

Next, functions and effects will be described. The design component 20 having the elongated shape includes the mounting portion 22 that has the elongated shape. The mounting portion 22 protrudes from the back surface 20B of the design component 20 and extends in the longitudinal direction of the design component 20. According to the configuration, the design component 20 can be produced by extrusion molding and thus the production cost can be reduced.

The design component mounting recess 520 in which the mounting portion 22 having the elongated shape is fitted is a groove. Therefore, the mounting portion 22 is continuously fitted in the design component mounting recess 520. Even through the design component 20 is very narrow and long, the design component 20 can be stably mounted to the interior assembly 50 for the entire length thereof. An interior component having an elongated shape and fixed to an interior assembly at multiple points may be easily deformed when the interior component is subjected to heat because the interior component tries to accommodate a variation between the adjacent points and thus an appearance thereof may deteriorate. Such a problem does not occur in the design component 20 because the design component 20 is mounted to the interior assembly 50 with the continuous fitting of the mounting portion 22 that extends in the longitudinal direction of the design component 20 to the design component mounting recess 520.

In addition to the mounting portion 22 fitted in the design component mounting recess 520, the locking portions 25 formed on the distal end surface 29 of the mounting portion 22 are inserted in the respective locking holes 525. This ensures the fitting of the mounting portion 22 in the design component mounting recess 520. The length L2 of the locking holes 525 measuring in the longitudinal direction of the design component 20 is greater than the length L1 of the locking portions 25 measuring in the longitudinal direction of the design component 20. Therefore, the spaces S1 are provided inside the locking holes 525 when the locking portions 25 are inserted in the respective locking holes 525. The spaces S1 accommodate the expansion and contraction of the design component 20 produced by heat. The ends 21 of the design component 20 are inserted in the respective insertion holes 51K. In comparison to a configuration in which the ends 21 are fixed with screws, the tips 21P of the ends 21 are more flexible and movable in the longitudinal direction of the design component 20. In addition to the spaces S1 in the locking holes 525, the spaces S2 are provides around the tips 21 of the design component 20. The spaces S2 also accommodate the expansion and the contraction in the longitudinal direction of the design component 20 due to heat. This reduces adverse effects on the design surface.

The mounting portion 22 includes the first protruding section 23 (the first to the third protrusions 23a to 23c) and the second protruding section 24 (the first to the third bumps 24a to 24c) protruding in the direction that crosses the fitting direction of the mounting portion 22 to the design component mounting recess 520. With the friction between the inner surfaces of the design component mounting recess 520 and the protruding sections 23 and 24, the mounting portion 22 are held against the inner surface of the design component mounting recess 520 in the sections in which the locking portions 25 are not present. This ensures the stable mounting condition of the design component 20. The design surface 20A of the design component 20 is a curved surface. Even if the design component 20 is deformed due to heat, the deformation is less likely to be recognized in comparison to a flat design surface. Therefore, the quality of appearance of the design surface 20A is maintained.

Other Embodiments

The technical scope of the present invention is applicable to interior component mounting structures of design components to door trims, roof side garnish trims, and instrument panels. The technical effects of the present invention can be exerted on mounting of elongated interior components to interior assembly components at various positions.

The invention claimed is:

1. An interior component mounting structure for mounting an elongated interior component to an interior assembly comprising:
   a mounting portion of the interior component formed by extrusion molding, the mounting portion protruding from a back surface of the interior component and extending along a longitudinal direction of the interior component;
   locking portions of the interior component protruding from a distal end of the mounting portion to be spaced at predefined intervals in the longitudinal direction of the interior component;
   insertion holes in the interior assembly into which ends of the interior component are inserted; and
   a fitting groove in the interior assembly in which the mounting portion is fitted and including locking holes in which the locking portions are held, respectively, the locking holes having a dimension measuring in the longitudinal direction of the interior component greater than a dimension of the locking portions measuring in the longitudinal direction of the interior component.

2. The interior component mounting structure according to claim 1, wherein the mounting portion comprises protruding sections protruding in a direction crossing a fitting direction in which the mounting portion is fitted into the fitting groove.

3. The interior component mounting structure according to claim 1, wherein the interior component includes a curved design surface.

4. The interior component mounting structure according to claim 1, wherein
the fitting groove includes a first recessed section and a second recessed section,
the first recessed section that is recessed from a design surface of the interior assembly with an opening in the design surface,
the first recessed section includes a back wall opposed to the opening,
the second recessed section is recessed from the back wall of the first recessed portion with an opening in the back wall of the first recessed portion,
the second recessed section includes a top wall, a bottom wall, and a back wall,
the top wall and the bottom wall extend in the longitudinal direction of the fitting recess,
the back wall is between ends of the top wall and the bottom wall away from the opening to connect the end of the top wall to the end of the bottom wall,
the first recessed portion has a short dimension of the opening greater than a short dimension of the opening of the second recessed portion,
the locking holes are formed in the back wall of the second recessed section,
the back surface of the interior component is disposed in the first recessed section, and
the mounting portion is fitted in the second recessed section.

5. The interior component mounting structure according to claim 4, wherein
the mounting portion comprises a body having an elongated shape along the top wall and the bottom wall of the second recessed section of the fitting groove, a first protruding section that protrudes from the body toward the top wall, and a second protruding section that protrudes from the body toward the bottom wall,
the first protruding section is held against the top wall, and the second protruding section is held against the bottom wall.

6. The interior component mounting structure according to claim 5, wherein
the interior component includes a design portion including the back surface of the interior component,
the design portion is disposed in the first recessed portion with at least a section of the design portion in contact with the back wall of the first recessed portion,
the locking portions includes bases that protrude from an end of the mounting portion away from the design portion and heads that protrude from distal ends of the bases,
the bases of the locking portions are disposed in the second recessed portion, and
the heads projects from the second recessed portion via the locking holes.

7. The interior component mounting structure according to claim 5, wherein
the mounting portion extends for about an entire length of the interior component, and
the fitting groove extends for about an entire length of the mounting portion.

8. The interior component mounting structure according to claim 4, wherein
the insertion holes are located at ends of the fitting groove between the top wall and the bottom wall of the second recessed section, and
the ends of the interior component are disposed in the insertion holes with at least tips of the ends of the interior component projecting from the fitting groove in the longitudinal direction of the interior component and held against edges of the fitting groove.

9. The interior component mounting structure according to claim 5, wherein the interior component is made of rubber.

10. The interior component mounting structure according to claim 9, wherein at least the first protruding section of the mounting portion has a dimension in a protruding direction of the first protruding section greater than a distance between the body of the mounting portion and the top wall of the second recessed section.

* * * * *